April 15, 1952  C. B. RICHEY  2,592,824
AUTO SWEEP RAKE
Filed Sept. 10, 1945  3 Sheets-Sheet 1
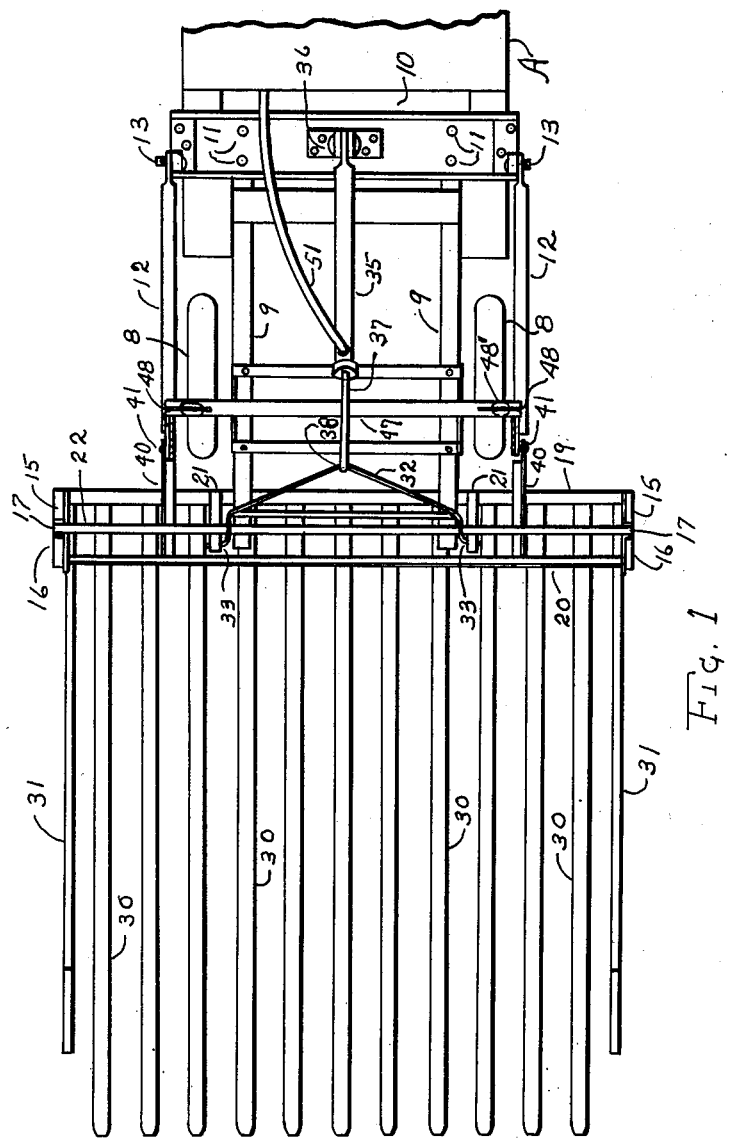
INVENTOR.
CLARENCE.B.RICHEY
BY a.S.Kroh
ATTORNEY April 15, 1952     C. B. RICHEY     2,592,824
AUTO SWEEP RAKE
Filed Sept. 10, 1945     3 Sheets-Sheet 2
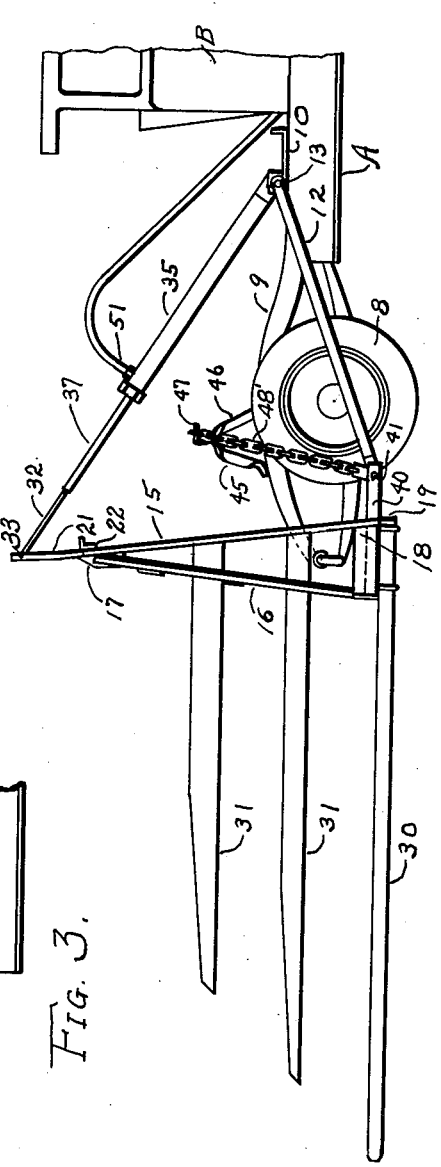
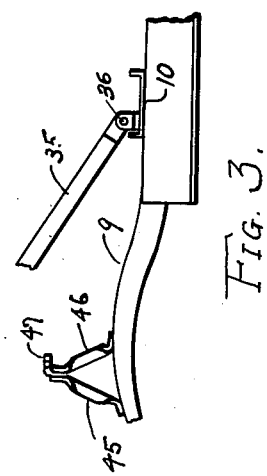
INVENTOR.
CLARENCE B. RICHEY
BY
ATTORNEY April 15, 1952 C. B. RICHEY 2,592,824
AUTO SWEEP RAKE
Filed Sept. 10, 1945 3 Sheets-Sheet 3
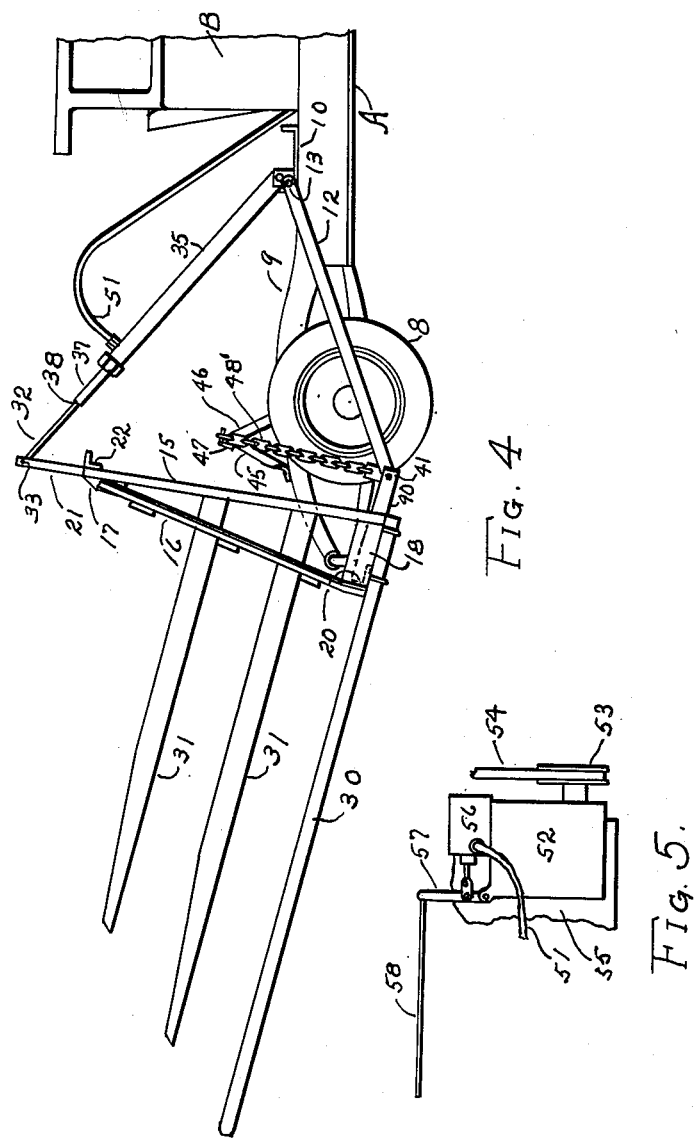
INVENTOR.
CLARENCE B. RICHEY
BY
ATTORNEY Patented Apr. 15, 1952

2,592,824

UNITED STATES PATENT OFFICE 2,592,824

AUTO SWEEP RAKE

Clarence B. Richey, Quincy, Ill., assignor to Electric Wheel Company, Quincy, Ill., a company of Illinois Application September 10, 1945, Serial No. 615,304

1 Claim. (Cl. 56—27)

The present invention relates to what may be termed auto sweep rakes because they are attached to a tractor, truck or automobile.

An object of the present invention is to provide a sweep rake which can be easily and quickly attached and detached from the carrying means and is simple, light and easily manufactured at low cost.

Another object of the present invention is to provide hydraulic means for raising and lowering the rake, including a hydraulic pump driven by the engine with a control valve having a connection which extends to within easy reach of the operator.

A still further object of the present invention is to provide a sweep rake having detachable connections to the carrying means which do not require more than a few bolt holes in the carrying means with which to make the attachment.

An important object of the present invention is to provide a sweep rake which in addition to handling hay, may be used for picking up and transporting grain shocks, combine straw and shocked corn.

To these and other useful ends my invention consists of parts, combinations of parts or their equivalents and mode of operation as hereinafter described and claimed and shown in the accompanying drawings in which:

Fig. 1 is a top view of my device shown as attached to an automobile after the part of the body in rear of the seat has been removed, a fraction only of the automobile being shown.

Fig. 2 is a side elevational view of my device as shown in Figure 1, showing the rake in a loading position.

Fig. 3 is a detail drawing illustrating the chain supporting bracket as attached to the side members of an automobile or truck frame.

Fig. 4 is a view similar to Figure 2 except with the rake in a raised position for transporting the load.

Fig. 5 illustrates a pump and valve box shown as attached to a fraction of the engine.

As thus illustrated reference character A designates a fraction of an automobile or truck having the body in rear of cab B removed and illustrating my improved fastening to the chassis of the automobile wherein 10 designates a channel bar which is detachably secured to the side frame members 9—9 of the chassis by means of bolts 11. Links 12—12 are at their forward ends pivotally attached to the ends of member 10 as at 13—13.

The rake comprises a frame consisting of end posts 15 and 16, the upper ends of which are secured together and to a cross member 22 as at 17, their bottoms being spaced apart and secured together by means of plates 18—18 (see Figures 2 and 4). The bottom ends of members 15 and 16 are secured together by means of cross members 19 and 20. I supply supplemental posts 21—21 which are at their bottoms secured to member 19 and near their tops to cross member 22.

I provide a number of spaced tines 30, their rear ends being secured to members 19 and 20. I also provide vertically spaced side tines 31—31 and attach these members to members 15 and 16 as clearly illustrated in Figures 2 and 4.

Members 21 extend a distance above member 22 and have pivotally secured thereto the rear ends of a V shaped member 32 as at 33—33. I pivotally mount a hydraulic cylinder 35 at its forward end to member 10 as at 36. Member 35 has a piston and a suitable piston rod 37 which is connected to the apex of member 32 as at 38.

The rear ends of members 12 are pivotally secured to the front ends of bars 40—40 as at 41. Members 40 are secured to members 19 and 20. On the top of members 9 I mount braces 45 and 46 to the upper end or apex of which a transverse angle bar 47 is secured.

The ends of members 47 terminate on substantially a vertical plane with members 12, and on the horizontal flange of each end of this bar I provide slots 48—48. A chain 48' is at its bottom secured preferably to the rear ends of members 12 adjacent hinges 41. Chains 48' are at their upper ends adjustably secured to the ends of member 47 by passing certain links into slots 48 for regulating the height of pivot 41.

The upper end of cylinder 35 has operatively connected thereto a flexible hose 51 which leads to valve box 56, which is mounted on a pump box 52. Pump box 52 has mounted therein the hydraulic pump (not shown) with a driving V belt pulley 53 which receives power from engine 55 (fractionally shown) by means of belt 54 (fractionally shown). Pump box 52 is preferably secured to the engine. Valve box 56 has a valve (not shown) which is operatively connected to the pump and tube 51 and has an operating connection to a lever 57, the free end of this lever having a link 58 which extends rearwardly to a point within each reach of the operator.

The valve is adapted to supply oil pressure to tube 51 when rod 58 is moved in one direction for lifting the rake as in Figure 4 and having means whereby when the rod is moved in the other direction tube 51 will be connected to a sump in pump box 52 at which time the weight of the front end of the rake will cause it to move downward by gravity on pivot 41 as an axis and finally to the position shown in Figure 2 for loading.

It will be seen by the foregoing that when the rake is substantially in the position as shown in Figure 2 the device may be backed into a pile of hay, a shock of corn, or into a pile or bale of straw after which the operator may cause the rake to be lifted as shown in Figure 4, and then the device may be moved to a place for unloading. To perform this unloading operation all that is necessary is for the operator to lower the rake so the tines 30 rest on the ground and move the vehicle forward for unloading, and the operator can then drive back for another load and repeat the operation.

It will be understood that I have shown the preferred form of the hydraulic lifting device wherein a piston and a piston rod are necessary. Clearly this lifting and lowering means may be differently designed and having a suitable connection to members 21 for the purpose.

Attention is called to the fact that chains 48 generally support the entire weight of the rake or part or all of the weight may be on the ground so that when loading, tines 30 may ride freely on the ground surface because of pivot 41.

Having thus shown and described my invention I claim:

In a sweep rake attachment for a motor vehicle comprising in combination, an elongated transverse member adapted to be secured to the chassis of the motor vehicle, at a distance forward of the rear wheels thereof, bars hingedly secured at their front ends to the ends of said transverse member and extending rearwardly and downwardly, a sweep rake hinged near its lower rear corner to the rear ends of said bars, another elongated transverse member mounted on said chassis frame and in rear of the rear wheels of the motor vehicle, chains secured to said bars adjacent their hinges to said sweep rake, their upper ends being adjustably secured to the ends of said other transverse member, a hydraulic cylinder transversely hinged at its front end to said first transverse member intermediate its ends, a source of liquid pressure having a valve with a tube connection to the upper end of said hydraulic cylinder, said cylinder having a piston and a protruding piston rod, said piston rod having an operating connection to the upper end of the rear part of said sweep rake, whereby the front end of the rake may be raised and lowered on said hinges by manipulating said valve, and whereby the lowest position of the rear end of said sweep rake may be determined by raising and lowering the chain adjustment to the outer ends of said other transverse member.

CLARENCE B. RICHEY.

REFERENCES CITED

The following references are of record in the file of this patent:

UNITED STATES PATENTS

| Number | Name | Date |
|---|---|---|
| 2,127,441 | Clark | Aug. 16, 1938 |
| 2,138,711 | Rowher | Nov. 29, 1938 |
| 2,271,591 | Hickman | Feb. 3, 1942 |
| 2,328,838 | Oberlink | Sept. 7, 1945 |
| 2,388,411 | Hicks | Nov. 6, 1945 |